(12) United States Patent
De Vries

(10) Patent No.: US 9,254,958 B2
(45) Date of Patent: Feb. 9, 2016

(54) STORAGE AND ORDER COLLECTION SYSTEM

(75) Inventor: Hugo Victor De Vries, Almere (NL)

(73) Assignee: I-COLLECTOR HOLDING B.V., Almere (NL)

( * ) Notice: Subject to any disclaimer, the term of this patent is extended or adjusted under 35 U.S.C. 154(b) by 919 days.

(21) Appl. No.: 13/147,253

(22) PCT Filed: Feb. 2, 2010

(86) PCT No.: PCT/NL2010/000015
§ 371 (c)(1),
(2), (4) Date: Aug. 1, 2011

(87) PCT Pub. No.: WO2010/090512
PCT Pub. Date: Aug. 12, 2010

(65) Prior Publication Data
US 2011/0318145 A1    Dec. 29, 2011

(30) Foreign Application Priority Data

Feb. 4, 2009    (NL) ...................................... 1036512

(51) Int. Cl.
*B65G 1/00*    (2006.01)
*B65G 1/04*    (2006.01)
(52) U.S. Cl.
CPC .................................. *B65G 1/0435* (2013.01)
(58) Field of Classification Search
CPC ........................................................ B65G 7/00
USPC ............ 414/273, 272, 278, 281, 285, 331.03, 414/331.04
See application file for complete search history.

(56) References Cited

U.S. PATENT DOCUMENTS

| 3,240,365 A | 3/1966 | King |
| 5,364,220 A | 11/1994 | Killinger |

(Continued)

FOREIGN PATENT DOCUMENTS

| CN | 1216285 A | 5/1999 |
| DE | 199 41 640 A1 | 5/2000 |

(Continued)

OTHER PUBLICATIONS

Translation of Chinese Office Action, dated Dec. 2013, from corresponding CN application.

(Continued)

*Primary Examiner* — Saul Rodriguez
*Assistant Examiner* — Willie Berry, Jr.
(74) *Attorney, Agent, or Firm* — Young & Thompson

(57) ABSTRACT

Device for the storage of articles and the formation of groups of articles therefrom, includes a frame having a first series of mutually parallel elongated storage sections that extend between a first end and a second end of the frame, a number of holders for the articles, wherein the storage sections are provided with holder supports on which a number of the holders can be supported, wherein at the first end and the second end of the frame first and second platforms, respectively, have been arranged which each are adapted for accommodating at least one holder, and movement elements for horizontally moving at least one holder from the first platform at the first end of the frame to the holder supports of a selected storage section while moving one or more holders representing a same holder length from the selected storage section to the second platform at the second end of the frame.

7 Claims, 8 Drawing Sheets

(56) References Cited

U.S. PATENT DOCUMENTS

| | | | |
|---|---|---|---|
| 6,061,607 A * | 5/2000 | Bradley et al. | 700/216 |
| 2004/0197172 A1 * | 10/2004 | Hansl et al. | 414/281 |

FOREIGN PATENT DOCUMENTS

| | | |
|---|---|---|
| DE | 100 58 625 A1 | 6/2002 |
| EP | 0 827 692 A1 | 3/1998 |
| GB | 1 389 221 A | 4/1975 |
| JP | H03-125707 | 12/1991 |
| JP | 04 042104 U | 4/1992 |

OTHER PUBLICATIONS

International Search Report, dated May 17, 2010, from corresponding PCT application.

Form PTO-892, dated Jul. 6, 2015 in corresponding U.S. Appl. No. 14/008,625.

* cited by examiner

STORAGE AND ORDER COLLECTION SYSTEM

BACKGROUND OF THE INVENTION

The invention relates to a storage and order assembly—or order picking system. The invention furthermore relates to a method for storing articles, particularly including order picking.

Storage and order picking systems are among others used at wholesalers, such as the trade in (spare) parts, and at retailers, such as apothecaries and supermarket delivery services.

In a first known system use is made of a frame in which a number of rows and columns of elongated storage sections are accommodated, that are oriented perpendicular to the supply side and which each are provided with a belt conveyor on which articles can be placed by a carrier that can be moved up and down and along the supply side. When an article has to be added to a selected storage section the belt conveyor is shifted up one place and the article is placed on the vacated spot on the belt conveyor. The articles placed previously then are shifted up one step. When receiving more than one article the belt conveyor is moved back in steps and the carrier picks up said articles. They are then taken to a collection location by the carrier, for putting the desired order together. A shortcoming of this system is the low speed. Furthermore the known system with drives for all belt conveyors of storage sections is complex and failure prone. When the depth of the system should be kept limited, more storage sections are required and the distances of movement for the carrier become longer.

In another known system, racks are positioned transverse to the main path, separated from one another by a transverse path, in which a carrier can be moved up and down and reciprocally. The racks form elongated storage sections, extending parallel to the transverse path, and from there, that means transverse to the storage sections, they are accessible by the carrier. This system has large dimensions in transverse direction.

SUMMARY OF THE INVENTION

It is an object of the invention to provide a storage—and order picking system and—method that is able to function at high speed.

It is an object of the invention to provide a storage—and order picking system and—method that is able to function with a low risk of failure.

It is an object of the invention to provide a storage—and order picking system and—method that may have an advantageous occupation of space/which requires little space at least considered in one plane.

For achieving at least one of those objects, from one aspect, the invention provides a device for the storage of articles and the formation of groups of articles therefrom, comprising a frame having a first series of mutually parallel elongated storage sections that extend between a first end and a second end of the frame, furthermore comprising a number of holders, such as carriers, for the articles, wherein the storage sections are provided with holder supports on which a number of the holders can be supported for storage of the articles, wherein at the first end and the second end of the frame first and second platforms, respectively, have been arranged which each are adapted for accommodating at least one holder, and first movement means for simultaneously moving said platforms from the one storage section to another storage section, wherein the device is provided with second movement means for horizontally moving at least one holder from the platform at the first end of the frame to the holder supports of a selected storage section while moving one or more holders representing a same holder length from the selected storage section to the platform at the second end of the frame. In that case the platforms only need to be moved either up and down or reciprocally along both ends, as a result of which the profile of movement can be kept limited. The said holder length is the length that one or more holders take up considered in direction of the storage section in question. The storage section remains occupied with holders over the full length. By accommodating a holder in a storage section, a holder is also discharged at the other end.

The speed can be enhanced when both platforms are adapted for supporting more than one holder.

The second movement means can also be provided for horizontally moving at least one holder from the platform at the second end of the frame to the holder supports of a selected storage section while moving one or more holders representing a same holder length from the storage section to the platform at the first end of the frame.

The device can be further simplified when the second movement means are provided on the first and/or the second platform. One or two such platforms can then suffice.

In an embodiment the second movement means directly engage onto a holder at the end of the row of holders that is situated on the storage level with both platforms. In a simple embodiment the second movement means engage onto a holder that is situated on a platform, particularly are designed as a pusher. By pushing the holder on the one platform onto the storage level, the holder at the other end is pushed onto the other platform.

In a compact embodiment of high storage capacity, the frame is provided with at least a second series of mutually parallel, elongated storage sections that extend between a first end and a second end of the frame, wherein the first and the second series are positioned above one another or next to each other and the device is provided with third movement means for simultaneously and horizontally moving the platforms from a position in line with a storage section of the one series to a position in line with a storage section of the second series.

It is noted that the first and third movement means in an embodiment can be combined for realising a diagonal movement.

The holders have a length in the direction of the storage section that is a singular or multiple of a module size, wherein the holders preferably have a horizontal dimension in the direction of the storage section that is a singular of a module size: all holders then have the same length. Each storage section is then able to support a number of N1 holders, wherein the number of storage sections is N2, wherein the number of holders in the device is at least N1×N2+1. All storage sections are in that case occupied with holders, wherein at all times a holder can be replaced in the manner discussed above. Preferably the number of holders in the device is at least N1×N2+2, in which way a higher speed can be achieved. Preferably the number of holders is N1×N2+N3, wherein N3 is the maximum number of holders that a platform is able to contain.

When one or several holders have a length of a multiple of the module size, then, in case of a given number of storage sections of N2 and a number of module sizes of N4 per storage section, the overall length occupied by holders can be at least N2×N4+1, preferably N2×N4+2. With N5 for the maximum number of module sizes that a platform may contain, a preferred embodiment will come to an overall occupied length of N2×N4+N5.

In one embodiment one of the storage sections is adapted for allowing a movement of the articles held by the holders thereof in a direction transverse to the storage section in question for discharging and/or receiving articles to and from, respectively, the device. Thus a (storage) section can be used for the entry and/or a (storage) section can be used for the exit, thus increasing the compactness. The exit section can for instance be used for putting groups of articles together, in a process of order picking.

In that case, two of the storage sections can be adapted for allowing a movement of the articles held by the holders thereof in a direction transverse to the storage section in question for discharging and/or receiving articles to and from, respectively, the device, wherein the said two storage sections are situated in a different series. The entry can then be at the other side of the device than the exit is. When holders can be removed, for instance in a direction transverse to the storage section in question, they can be treated further including the article, but an empty holder has to be placed back indeed in order to be able to continue moving the holders on the exit section as well in longitudinal direction.

In one embodiment that is compact in a horizontal plane, the first series of storage sections form a column in which the storage sections are situated above one another.

In one embodiment that is compact in a vertical plane the first series of storage sections form a horizontal row in which the storage sections are situated next to one another.

The device can be provided with an automatic control with a programmable control system for controlling the movement means, wherein the control system is programmed for having the articles moved exclusively by the first platform along the ends of the storage sections. The control system can be programmed for having the empty holders moved exclusively by the second platform. The division of the entered articles and the movement of the loaded holders then takes place at the one end, movement of the empty holders at the opposite end.

In connection therewith, according to a further aspect, the invention provides a method for keeping articles in store, wherein the articles are stored in a device, which device comprises a frame having a first series of elongated storage sections placed parallel to each other and extending between a first end and a second end of the frame, furthermore comprising a number of holders for the articles, wherein the storage sections are provided with holder supports on which a number of the holders can be supported for storage of the articles, wherein at the first end and the second end of the frame a first and a second platform, respectively, have been arranged, wherein a supplied article is placed on a holder and with the holder is taken exclusively by the first platform to a selected storage section, the holder in question is received from the first platform on the holder supports of said storage section while discharging an empty holder from said same storage section to the second platform.

For retrieving the articles from store, in a further embodiment, the first platform and the second platform are taken to a selected storage section and an empty holder is received from the second platform on the holder supports of said storage section while discharging a holder with article from said same storage section to the first platform, after which the holder with article is taken by the first platform to a location for discharging the article.

Here again the second platform can be used for vertical movement of exclusively empty holders.

From a further aspect the invention provides a method for placing articles in store and taking them from store, wherein the articles are stored in a device, which device comprises a frame having a group of a number of elongated storage sections placed parallel to each other and extending between a first end and a second end of the frame, furthermore comprising a number of holders for the articles, wherein the storage sections are provided with holder supports on which a number of the holders can be supported for storage of the articles, wherein at the first end and the second end of the frame a first and a second platform, respectively, have been arranged, wherein a first and a second supplied article are placed on a first and a second holder, respectively, and therewith are taken to at least one selected storage section by the first platform, the holders are received from the first platform on the holder supports of the at least one selected storage section while discharging empty holders from the at least one selected storage section to the second platform. It is possible here that the first holder is placed on a first selected storage section and the second holder on another, second selected storage section. In that way the supplied articles can be sorted for instance according to type, wherein a storage section is assigned to a type.

In one embodiment the first and the second selected storage sections are situated at different levels. In an alternative or supplementary embodiment the first and second selected storage sections are situated next to each other, wherein the first platform and the second platform after discharging the first holder are moved horizontally from the first selected storage section to the second selected storage section. When both storage sections in that case are situated at different levels a vertical movement has to be carried out as well of course.

In a further embodiment, the articles when supplied can be placed in the first and second holders when they are situated on an entry section that is included in the group, wherein the first and second holders are taken from the entry section onto the first platform while discharging empty holders from the second platform to the entry section. In that case the articles when supplied can be placed in the first and second holders in the entry section according to a substantially horizontal entry direction transverse to a vertical plane that contains the first and second platforms, particularly from the front side of the device.

In view of order picking following storage, in a further embodiment, for retrieving a first and a second article from store which articles are held by first and second holders, respectively, the first platform and the second platform can be taken to at least one selected storage section, empty holders are received from the second platform onto the at least one selected storage section while discharging the first and second holders to the first platform, after which the first and second holders with articles are taken by the first platform to a location for discharging the articles.

Here, articles from different storage sections, particularly of different types, can be collected, for which reason the first holder is received from a first selected storage section and the second holder from another second selected storage section. Also in this case there can be question of the first and second selected storage sections being situated at a different level and/or being situated next to each other, as described above.

For picking the order, as mentioned above, use can be made of an exit section of the device, wherein the first and second holders for discharging the articles are placed on the exit section that is included in the group, wherein the first and second holders are discharged from the first platform to the exit section while discharging empty holders from the entry section to the second platform. The articles for exit can be removed from the exit section according to a substantially horizontal entry direction transverse to a vertical plane that contains the first and second platforms, preferably at a rear side of the device.

It is noted that the invention where there is question of first and second holders for first and second articles, an embodiment having several holders, for instance three, that are placed in different storage sections or are removed from different storage sections, is also aimed at.

According to a further aspect the invention provides a device intended for grouping and/or for picking products for orders, comprising a rack-shaped storage device having several elongated storage sections situated above one another and next to each other, characterised in that said storage sections are entirely filled with loose holders or product carriers, and in that the device furthermore at both longitudinal ends of the storage sections comprises movable platforms, which are provided with a mover, such as a pusher or ejector, for a product carrier, and which moves at least one product carrier to a storage section and at one longitudinal end shifts it in the storage section as a result of which all product carriers in that section are shifted onwards and at least one product carrier at the other longitudinal end is shifted onto the opposite movable platform.

In one embodiment thereof one movable platform serves exclusively for receiving, moving and pushing in one or more product carriers provided with a product whereas the other movable platform exclusively serves to receive, move and push in empty product carriers.

The movable platforms can be provided with means for moving the product carriers that are situated entirely or partially on the platform against the operation stroke direction of an ejector. The movement means can then be formed by the upper surface of the drive belts which also serve to move the ejector.

In one embodiment during pushing the product carriers into a section, the ejector on the opposite platform serves as stop for the row of product carriers to be shifted onwards.

The device according to the invention is particularly interesting for the following uses.

Order picking. In that case identical products are entered in batches into the same storage location as much as possible. Subsequently said products combined with other products in smaller units, are discharged from different storage locations.

Grouping. In that case products that enter in small units, depending on the destination, are entered into various storage locations. Subsequently the entering products with the same destination are entered into the same storage location. When a group of products having an identical destination is complete it can be discharged as a batch and for instance be palletised.

From another aspect, the invention provides a system intended to buffer the incoming flow of products and subsequently to discharge it in a different order wherein the system comprises a storage device having several storage sections that are entirely filled with holders or product carriers with at the ends of the storage sections a movable entering device wherein the one entering device serves for entering and moving full product carriers and the other entering device substantially serves for entering and moving empty product carriers, which entering devices are held substantially in line with each other.

In the storage device there are at least two storage sections that can be approached from the side, transverse to the longitudinal direction of the storage sections, as a result of which products can be entered and discharged. In order to easily be able to place and remove products in an embodiment the product carriers are only provided with a raised front and rear side. The sides are formed by the L-shaped carrier supports which at the location of the product entry and exit point can be lowered.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

BRIEF DESCRIPTION OF THE DRAWINGS

The invention will be elucidated on the basis of a number of exemplary embodiments shown in the attached drawings, in which.

DETAILED DESCRIPTION OF THE DRAWINGS

Figure 1A:
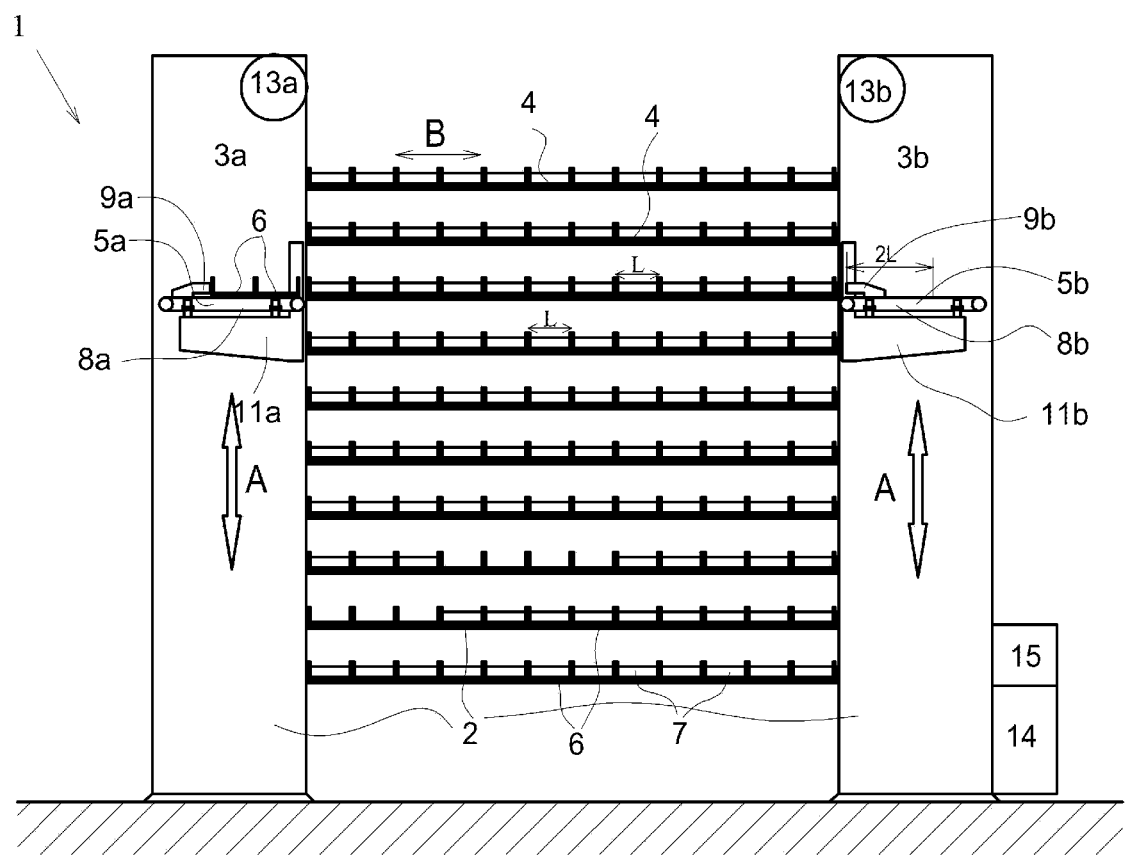
FIGS. 1A-C schematically show a front view, top view and side view, respectively, of an exemplary embodiment of a device according to the invention.
Figure 1B:
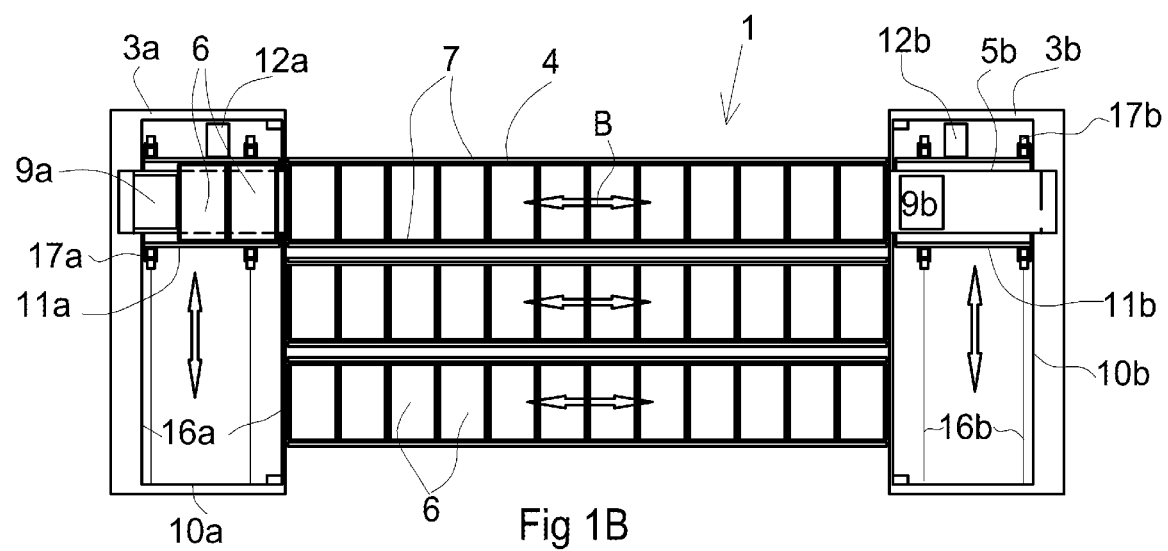
Figure 1C:
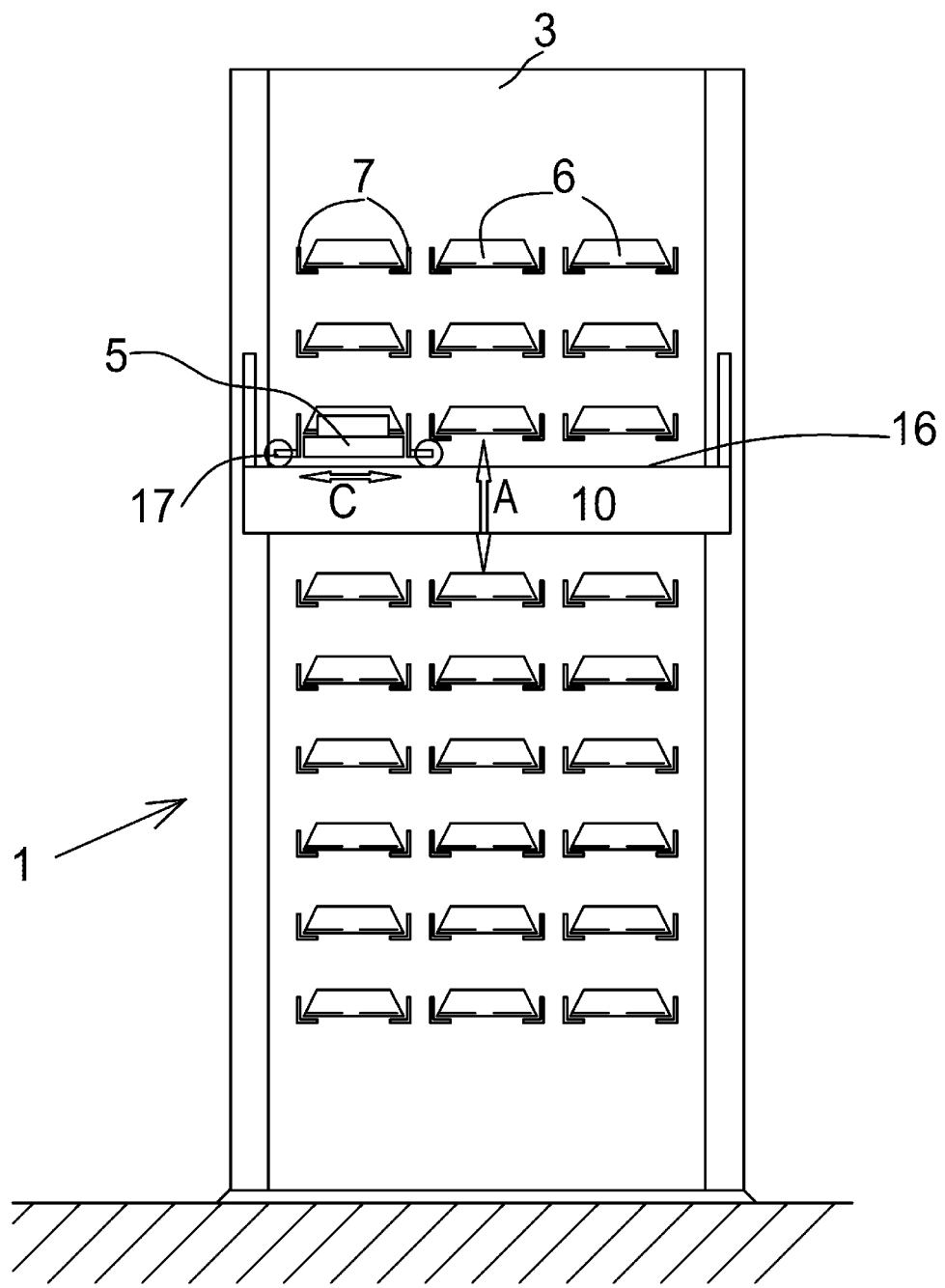

The exemplary embodiment 1 shown in FIGS. 1A-C is substantially column-shaped and comprises a frame 2 having two elevator shafts 3a,3b at two longitudinal ends and storage sections borne in between them, in this case storage levels 4, in this example nine, which in this example are positioned in three columns. In each elevator shaft 3a,b a platform 5a,b is accommodated, which can be moved up and down by electromotors 13a,b, direction A. In the device 1 a number of carriers or holders for articles are housed.

Each platform 5a,b is supported on a frame 11a,b and comprises a belt conveyor 8a,b that is drivable by means of electromotors 12a,b. On the belts 8a,b pushers 9a,b are attached for movement along with them. The belts 8a,b have a support surface of approximately 2L, wherein L is the length of a holder 6, measured in main direction of a storage level 4, in this example corresponding with a module size.

The frames 11a,b with platforms 5a,b are supported on a frame 10a,b by wheels 17a,b and can be moved in the direction C over rails 16a,b by means of electromotors, not shown, provided on the platforms.

Each storage level 4 comprises two support profiles 7, on which a series of holders 6 is supported, in a way so as to be easily shiftable in the direction B. The support profiles 7 have a support length of approximately a full number of lengths L of the holder 6, in this example 12L.

For controlling the said electromotors a control unit 14 with programmable computer 15 is present.

The holders 6 are provided with unique identification marks, such as a barcode. For reading the barcodes sensors are present, that are functionally connected to the control unit 14/computer 15. In the control unit 14 a connection can be made between a holder and an article placed thereon, so that it is exactly known at what location in the device an article is situated and which article it is.

One of the storage sections 4 can be suitable for entry, for instance level 4a, and one for exit for instance level 4b. The entry level 4a and the exit level 4b can be situated at opposite main sides of the device 1, so that the direction of entry V can be the same as the direction of exit T, see FIG. 4. The entry and exit levels are situated at a level which to a person involved in entering/discharging, is ergonomically advantageous.

When storing a group of identical articles Pi the articles are placed in the direction V on or in the holders 6 of entry level 4a. The platforms 5a,b have been brought at the same level and in line with the entry level 4a. After loading the belt 8b is activated. On the belt 8b there are two empty holders 6, on belt 8a none, so that the overall number of holders on platforms and storage levels is 3×9×12+2. By the pusher 9b said holders 6 are pushed at the right-hand side onto the support profiles 7 of the entry level. Said pushing force is transferred via the holders 6 of said level to the two most left holders 6 that are each carrying an article Pi. All holders 6 thus shift onwards to the left, while discharging the two loaded holders 6 to the belt 8a, direction D2. The belt 8a can then be idle or be driven synchronously.

After both holders 6 are positioned on the belt 8a, the platforms 5a,b are lifted, direction E, to the selected storage level 4. When the latter is situated in a different column movement will also take place in the direction C.

When the platforms 5a,b have come to be in line with the selected storage level 4, the belt 8a is activated in order to urge the loaded holders 6 by means of pusher 9a to the right, direction F1, onto the support profiles 7 of said level. As a result at the right-hand end two empty holders 6 are shifted onto the belt 8b, in a comparable manner as described above for the left-hand end. After the loaded holders have been discharged the platforms 5a,b can be moved downwards again, direction G, in order to be brought in line again with entry level 4a, after which the same process can start over again. This can be repeated as long as there are still empty holders at the selected storage level. After that another storage level can be used.

Figure 3A:
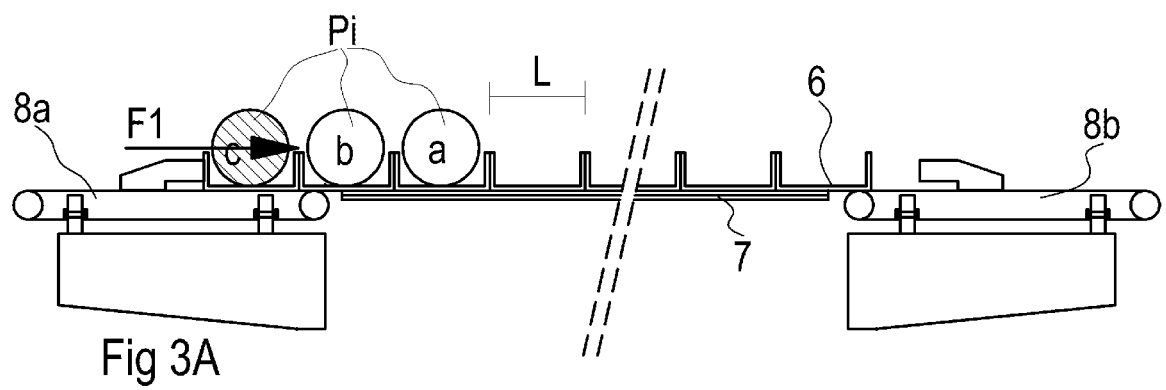
FIGS. 3A-C show some details of an example of a process of transferring articles within a device according to the invention.
Figure 3B:
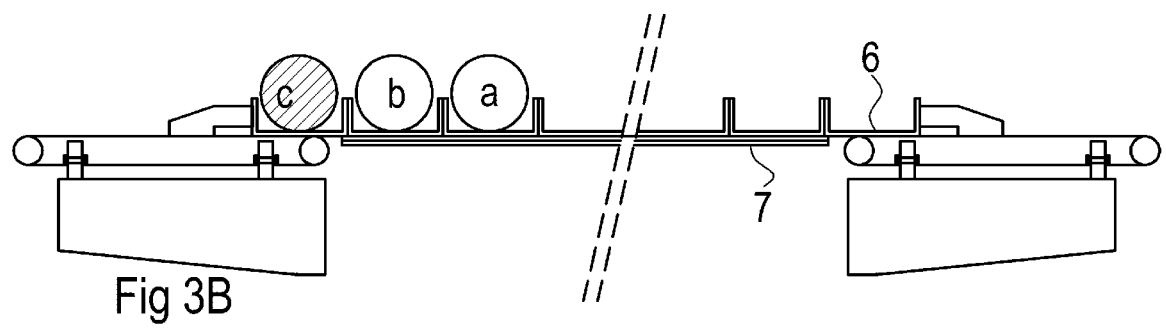
Figure 3C:
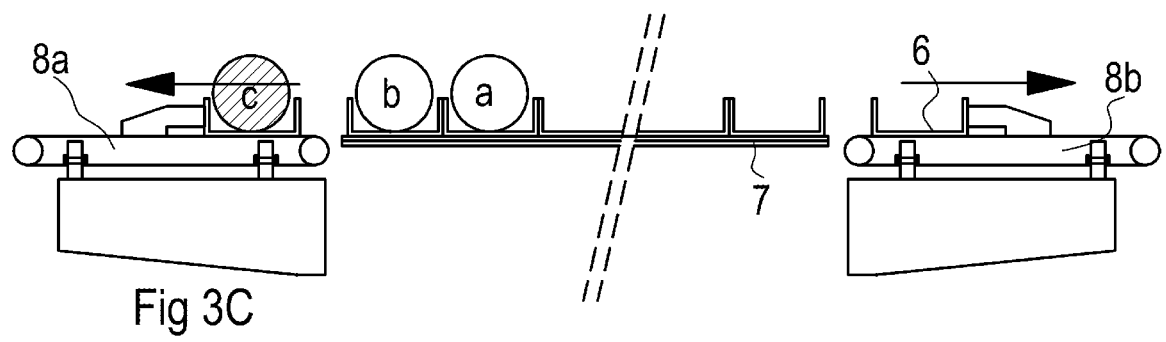

When the articles Pi are different and for that reason have to be stored at different storage levels, platform 5a will be used for first discharging one article Pi to the one selected storage level, and subsequently the next, different article on another selected storage level. This is for instance shown in FIGS. 3A-C, where the article b is discharged to a storage level, but a different article c is still kept on the belt 8a. As shown, at the end of discharging, the belts 8a,b can be driven in a slightly opposite manner, in order to make the holder 6 with article c and the empty holder on belt 8b entirely free from the storage level, before moving the platforms 5a,b.

It is also possible to assign storage levels to certain destinations. In that case for instance identical articles Pi can be distributed over different levels. Other, different articles Pi can then be distributed over the same levels, or over a part thereof. Thus on each assigned level an individual collection of articles is brought together, also grouped.

Figure 2A:
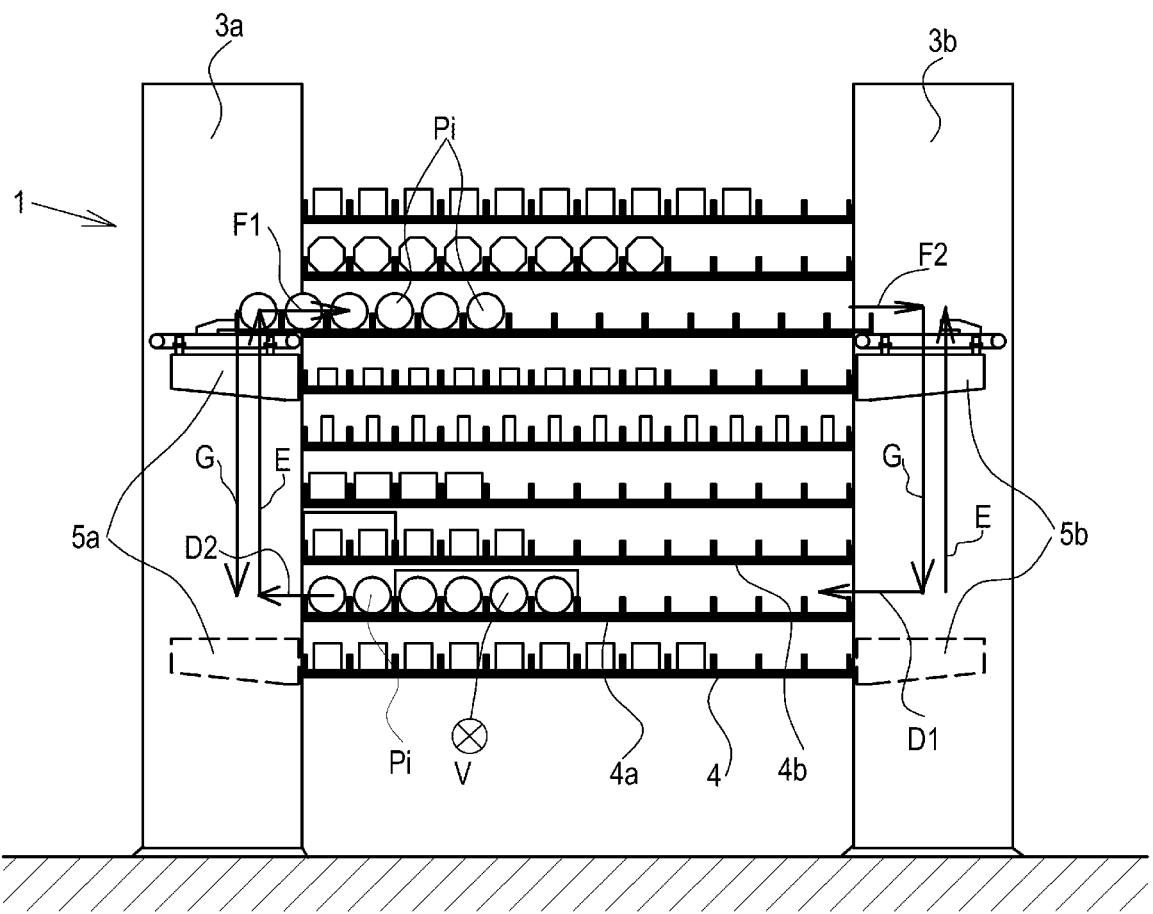
FIGS. 2A and 2B show a side view of a process of storing articles in the device of FIGS. 1A-C and a process of order picking in the device of FIGS. 1A-C, respectively.
Figure 2B:
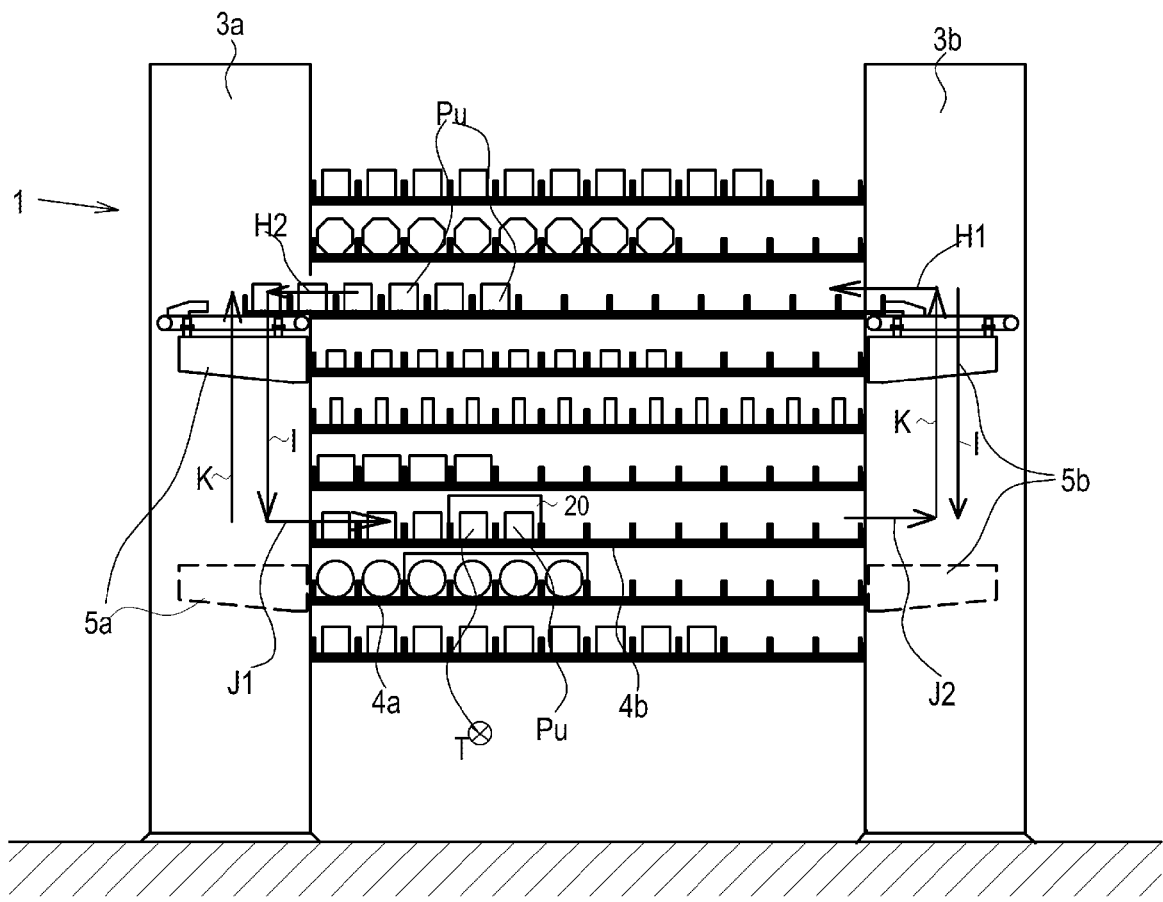

For picking an order of for instance articles Pu the platforms 5a,b are brought in line with the selected storage level 4 (FIG. 2B). Belt 8b is subsequently driven in order to push the empty holders 6 on it to the left, direction H1, by means of pusher 9b. As a result thereof at the left-hand end, two loaded holders 6 are urged onto the belt 8a, direction H2. Subsequently the platforms 5a,b are moved downwards, direction I, until they are in line, optionally after movement in direction C (FIG. 1C), with exit level 4b. At that location the belt 8a is activated, so that by means of the pusher 9a two loaded holders 6 are urged in the direction J1 onto the support profiles 7 of the exit level 4b. As a result thereof at the right-hand end two empty holders 6 are pushed onto the belt 8b, direction J2. After the loaded holders have been discharged to the exit level 4b the platforms 5a,b can be moved upwards again, direction K, in order to be brought in line again with the level where the articles have to be removed, after which the same process can start over again.

When the order is ready, or room has to be made, the articles Pu can be removed in the direction T from the exit level 4b, via passage 20.

It is also possible to make an order of different articles, for which purpose articles are taken from different storage levels in the described manner and are placed on the exit level.

In the aforementioned case of grouping articles on assigned levels the collection has already taken place and for instance the entire group can be transferred in steps from a level to the exit level.

It is noted that instead of being loaded with singular articles, the holders can also be loaded with a multiple of articles, or a combination of articles, for instance a package of medicines customized to a patient.

It is furthermore noted that the holders 6 can also be designed so as to be multiple, having multiple compartments.

For facilitating in a direction transverse to the main direction of a storage section the holders can be substantially U-shaped, wherein the legs form upright edges or walls that are transverse to said main direction.

Figure 4A:
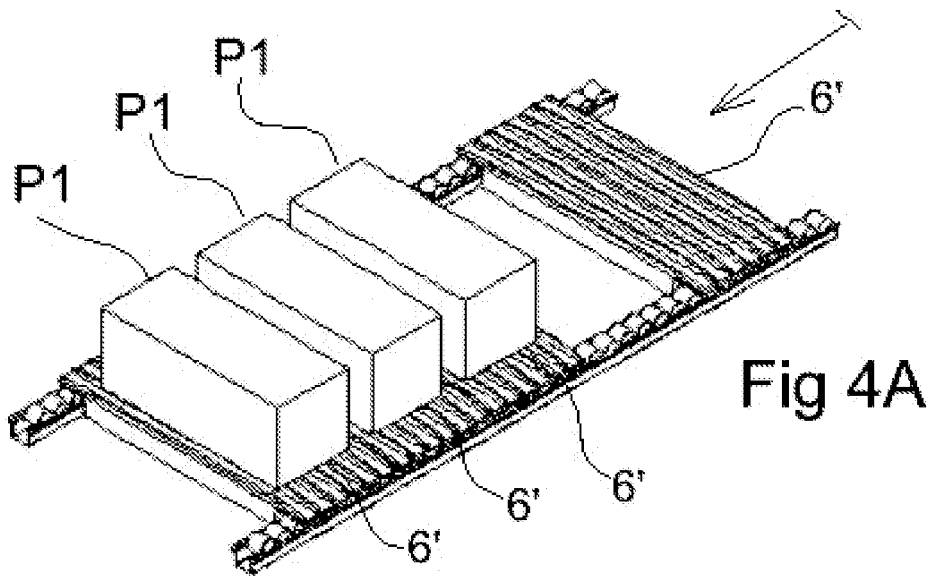
FIGS. 4A-C show a number of examples of use of an alternative embodiment of holders for a device according to the invention.
Figure 4B:
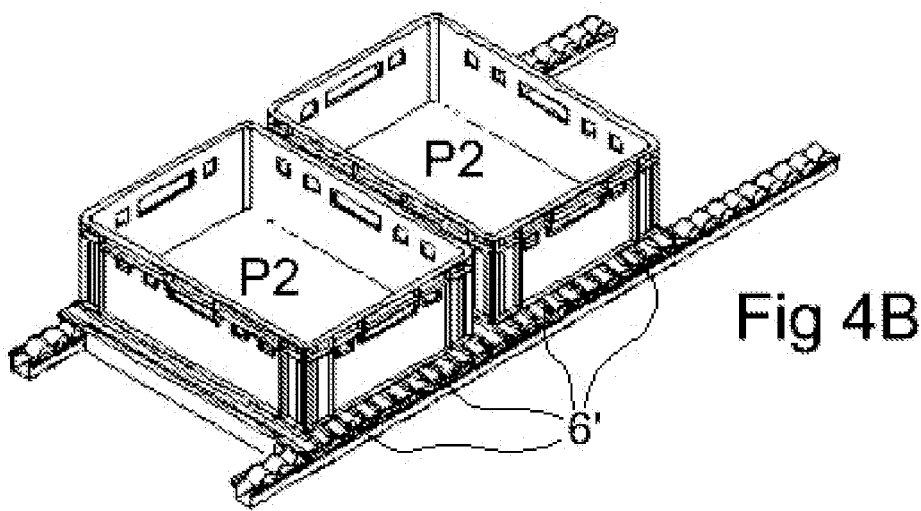
Figure 4C:
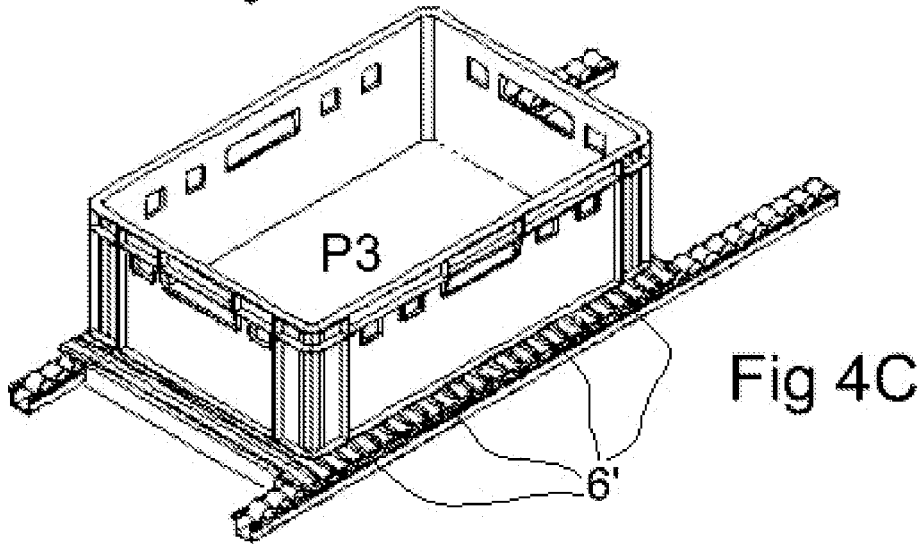

In an embodiment, see FIGS. 4A-C, it is also possible to use holders 6' that do not have upright walls or edges that are transverse to the main direction, but as shown, merge into each other with their support surfaces. An advantage thereof is that adjacently situated holders are able to offer a large support surface, as a result of which articles that are larger than one holder can also be handled. In FIG. 4A the holders 6' each carry one article, a box P1, in FIG. 4B four holders 6' together carry two crates P2, in FIG. 4C the four holders 6' together carry one larger crate P3. In the cases of FIGS. 4B and 4C the platforms will be adapted thereto as regards length.

Figure 5:
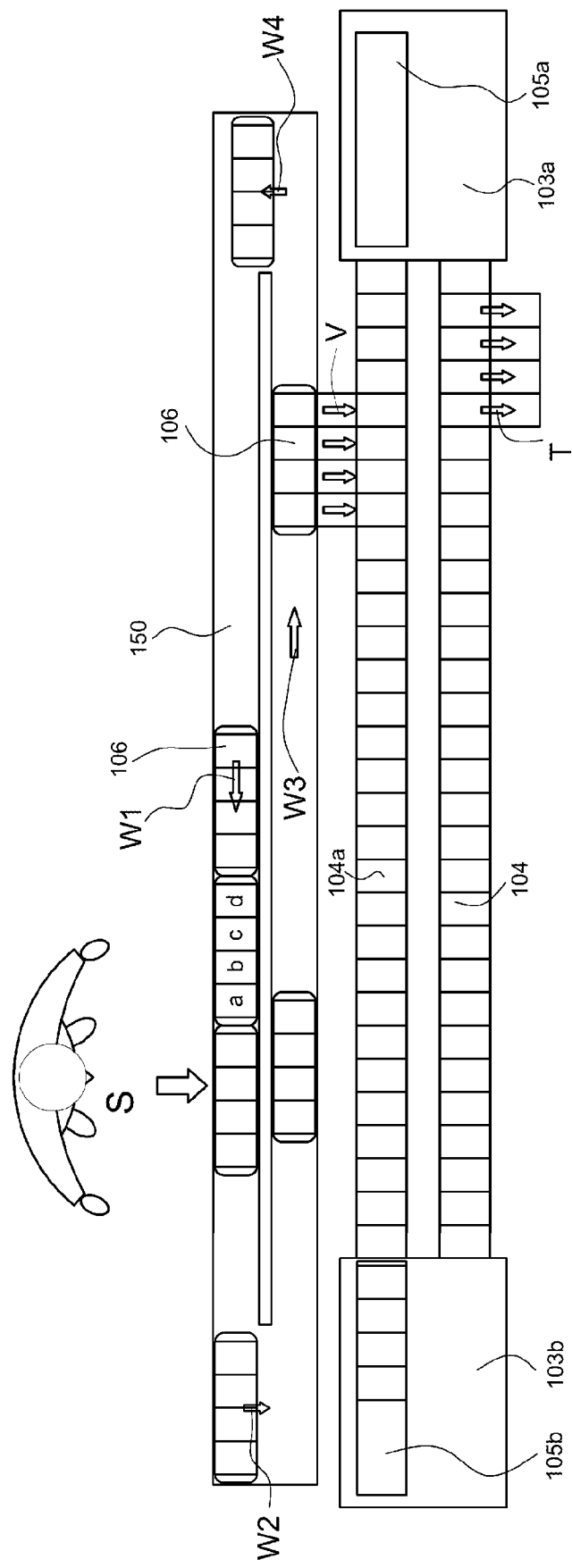
FIG. 5 shows a schematic top view of a comparable exemplary embodiment of a device according to the invention.

To illustrate the supply, in FIG. 5 in front of the device 101, which in principle corresponds with device 1, a supply conveyor 150 is positioned, on which multiple holders 106 with four compartments a-d. The filler places the articles (direction S) in an empty holder 106, that arrives in direction W1. The loaded holder 106 runs, directions W2, W3, to the location of entry, where an ejector that is not shown delivers the articles in the direction V to a holder 106 on the entry level 104a. In the manner described above, said holder 106 later ends up on platform 105a, which in this example by way of example is adapted for supporting one holder 106.

The above description is included to illustrate the operation of preferred embodiments of the invention and not to limit the scope of the invention. Starting from the above explanation many variants that fall within the spirit and scope of the present invention will be evident to an expert.

The invention claimed is:

1. A device for the storage of articles and the formation of groups of articles therefrom, the device comprising:
a frame having a first series of mutually parallel elongated storage sections that extend horizontally between a first end and a second end of the frame, at least a first of the storage sections forming one of i) an entry section for the articles to the device and ii) a discharge section for the articles from the device;
plural holders for storage of the articles;
holder supports provided in the storage sections, the holder supports provided for supporting the holders for storage of the articles;
first and second platforms provided respectively at the first end and the second end of the frame, wherein each of the first and second platform are adapted for accommodating at least one of said plural holders;
first movement means for simultaneously moving said first and second platforms between the storage sections, including the first storage section;
second movement means that
   i) horizontally moves a first group of one or more holders representing a first holder length and accommodated by the first platform from the first platform at the first end of the frame to the holder supports of a selected storage section while moving a second group of one or more other holders representing the first holder length from the selected storage section to the second platform at the second end of the frame, and
   ii) horizontally moves a third group of one or more holders representing a second holder length and accommodated by the second platform from second platform at the second end of the frame to the holder supports of a selected storage section while moving a fourth group of one or more holders representing the second holder length from the same selected storage section to the first platform at the first end of the frame,
wherein said first storage section, forming one of the entry section for the articles to the device and the discharge section for the articles from the device, allows a movement of the articles held by the holders thereof in a direction transverse to the first storage section for receiving and discharging articles into and from, respectively, said first storage section and thereby the device,
wherein in the first series, the storage sections are positioned one above the other, and
wherein the frame is provided with at least a second series of mutually parallel, elongated storage sections that extend between the first end and the second end of the frame, the first and the second series of mutually parallel, elongated storage sections being positioned next to each other, the device being provided with third movement means for simultaneously moving the first and second platforms from a position in line with a storage section of the first series to a position in line with a storage section of the second series; and
a programmable control system for controlling the first and second and third movement means,
wherein the control system is programmed for having the articles be moved exclusively by the first platform past the ends of the storage sections, and
wherein the control system is programmed for having the empty holders be moved exclusively by the second platform.

2. The device according to claim 1, wherein each of the first and second platforms are adapted for simultaneously supporting more than one holder.

3. The device according to claim 1, wherein the second movement means are provided on the first platform and on the second platform.

4. The device according to claim 1, wherein the second movement means directly engage onto a corresponding holder at the end of a row of holders that is situated on the storage section with both the first and second platforms, said corresponding holder being situated on one of the first and second platforms, said second movement means forming a pusher.

5. The device according to claim 1, wherein the holders have a horizontal dimension in the direction of the storage section that is a multiple of a module size, and wherein each storage section supports a number of N1 holders and the number of storage sections is N2, wherein the number of holders in the device is at least N1×N2+2.

6. The device according to claim 5, wherein the maximum number of holders to be contained by a platform is N3, wherein the number of holders in the device is at least N1×N2+N3.

7. Method for placing articles in store and taking them from store, wherein the articles are stored in a device, which device comprises a frame having a first series of elongated storage sections placed parallel to each other and extending between a first end and a second end of the frame, furthermore comprising a number of holders for the articles, wherein the storage sections are provided with holder supports on which a number of the holders can be supported for storage of the articles, wherein at the first end and at the second end of the frame a first platform and a second platform, respectively, have been arranged, wherein a supplied article is placed on a holder and with the holder is taken by the first platform to a selected storage section, the holder in question is received from the first platform on the holder supports of said storage section while discharging an empty holder from said same storage section to the second platform, wherein for retrieving the articles from store, the first platform and the second platform are taken to a selected storage section and an empty holder is received from the second platform on the holder supports of said storage section while discharging a holder with article from said storage section to the first platform, after which the holder with article is taken by the first platform to a location for discharging the article, wherein the first platform is used for movement of exclusively holders carrying articles and the second platform is used for movement of exclusively empty holders.

* * * * *